(12) United States Patent
Yeh

(10) Patent No.: US 11,362,473 B2
(45) Date of Patent: Jun. 14, 2022

(54) DEVICE AND METHOD FOR PRODUCING A PATTERNED FUNCTIONAL COATING FOR A GLASS LAYER

(71) Applicant: SAINT-GOBAIN GLASS FRANCE, Courbevoie (FR)

(72) Inventor: Li-Ya Yeh, Geilenkirchen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 449 days.

(21) Appl. No.: 16/336,341

(22) PCT Filed: Aug. 7, 2017

(86) PCT No.: PCT/EP2017/069939
§ 371 (c)(1),
(2) Date: Mar. 25, 2019

(87) PCT Pub. No.: WO2018/054595
PCT Pub. Date: Mar. 29, 2018

(65) Prior Publication Data
US 2021/0276130 A1    Sep. 9, 2021

(30) Foreign Application Priority Data

Sep. 26, 2016 (EP) ..................................... 16190620

(51) Int. Cl.
*H01S 3/10* (2006.01)
*H01S 3/00* (2006.01)
(Continued)

(52) U.S. Cl.
CPC ................ *H01S 3/00* (2013.01); *H01S 3/005* (2013.01); *H01S 3/0007* (2013.01);
(Continued)

(58) Field of Classification Search
CPC .......... H01S 3/00; H01S 3/007; H01S 3/0014; H01S 3/005; H01S 3/10046; H01S 3/2232
See application file for complete search history.

(56) References Cited

U.S. PATENT DOCUMENTS 5,131,967 A * 7/1992 Tweadey, II ...... B32B 17/10036
156/101
2002/0192428 A1* 12/2002 Sol .......................... C03C 17/36
428/138
(Continued)

FOREIGN PATENT DOCUMENTS

DE    103 16 576 B3    11/2004
EA            17970 B1     4/2013
(Continued)

OTHER PUBLICATIONS

International Search Report as issued in International Patent Application No. PCT/EP2017/069939, dated Nov. 8, 2017.

*Primary Examiner* — Kinam Park
(74) *Attorney, Agent, or Firm* — Pillsbury Winthrop Shaw Pittman LLP

(57) ABSTRACT

A device and a method for producing a patterned functional coating on a first curved glass layer, the device including a support for holding the first curved glass layer, at least one laser, and a guidance unit, provided for guiding the beam of the laser over the functional coating, such that parts of the functional coating are removed in order to pattern the functional coating.

7 Claims, 5 Drawing Sheets

(51) Int. Cl.
  *H01S 3/223* (2006.01)
  *B23K 26/364* (2014.01)
  *B23K 103/16* (2006.01)
  *B23K 103/00* (2006.01)

(52) U.S. Cl.
  CPC ........ *H01S 3/0014* (2013.01); *H01S 3/10046* (2013.01); *H01S 3/10053* (2013.01); *H01S 3/2232* (2013.01); *B23K 26/364* (2015.10); *B23K 2103/172* (2018.08); *B23K 2103/54* (2018.08); *C03C 2218/328* (2013.01)

(56) References Cited

U.S. PATENT DOCUMENTS

| | | | |
|---|---|---|---|
| 2004/0037011 | A1 | 2/2004 | Inoue et al. |
| 2009/0197078 | A1* | 8/2009 | Vissing ............... B01D 69/02 428/336 |
| 2009/0224178 | A1 | 9/2009 | Champonnois et al. |
| 2009/0242527 | A1* | 10/2009 | Anger .................. B23K 26/40 219/121.69 |
| 2013/0256285 | A1 | 10/2013 | Baxter et al. |
| 2015/0343884 | A1 | 12/2015 | Rousselet et al. |
| 2017/0327420 | A1 | 11/2017 | Schulz et al. |
| 2019/0270668 | A1* | 9/2019 | Lee ..................... C03C 17/002 |

FOREIGN PATENT DOCUMENTS

| | | |
|---|---|---|
| EA | 20860 B1 | 2/2015 |
| EP | 3 034 295 A1 | 6/2016 |
| JP | H11-174686 A | 7/1999 |
| JP | 2002-508249 A | 3/2002 |
| JP | 2004-082161 A | 3/2004 |
| JP | 2004-322106 A | 11/2004 |
| JP | 2004-335863 A | 11/2004 |
| JP | 2008-546535 A | 12/2008 |
| JP | 2009-233747 A | 10/2009 |
| JP | 2016-506308 A | 3/2016 |
| KR | 10 2015 0054985 A | 5/2015 |
| RU | 2178576 C2 | 1/2002 |
| RU | 2290315 C2 | 12/2006 |
| RU | 2394780 C1 | 7/2010 |
| RU | 2516606 C2 | 5/2014 |
| RU | 2573160 C2 | 1/2016 |
| WO | WO 99/30845 A1 | 6/1999 |
| WO | WO 2016/096435 A1 | 6/2016 |

* cited by examiner

DEVICE AND METHOD FOR PRODUCING A PATTERNED FUNCTIONAL COATING FOR A GLASS LAYER

CROSS-REFERENCE TO RELATED APPLICATIONS

This application is the U.S. National Stage of PCT/EP2017/069939, filed Aug. 7, 2017, which in turn claims priority to European patent application number 16190620.1, filed Sep. 26, 2016. The content of these applications are incorporated herein by reference in their entireties.

The invention relates to a device and a method for producing a patterned functional coating for a glass layer.

BACKGROUND OF THE INVENTION

Known from the prior art is, for example, DE 103 16 576 B3 from which a method and device for producing soft contact lenses are known. The method is based on specific steps for hydration and desalination of a soft contact lens and subsequent laser removal of lens material for producing so-called "multifocal lenses". Further known from the prior art is US patent application 2009/242 527 A1. This patent application discloses a method for removal of a scratch resistant layer or an antireflection layer in order to provide improved adhesive bonding of a lens of rimless spectacles.

In the following, using the example of the production of a conventional vehicle window pane, some problems are presented that gave rise to the invention, individually and in combination.

In order to address aerodynamic as well as stylistic requirements, many vehicle window panes are curved. Vehicle window panes also carry a large number of functions, for example, pane heating, antennas, sensors, etc.

In order, for example, to provide electrical heating, thin electrically conductive layers are applied, for example, using known techniques, such as screenprinting or vapor deposition.

During production in prior art methods, as described, e.g., in EP 3 034 295 A, first, the electrically conductive layer is applied to a flat glass pane and subsequently patterned. Only relatively small regions, approx. 15 cm*15 cm, can be processed in one step. If larger areas have to be patterned, overlapping and misalignment generally develop at the edges such that the course of the patterned edges has steps and jumps.

In order to bend a glass pane, it has to be heated to a relatively high temperature, e.g., 600° C. Since the electrically conductive layer would react with the surrounding atmosphere at these temperatures, before bending, the coating must be completely protected by a protective layer, e.g., $NaSO_4$.

However, it has been demonstrated that this protection is inadequate, such that reactions still occur, in particular in the edge region of the patterned functional coating.

Another problem is that under the influence of heating, the electrically conductive layer is frequently heated so much that flow processes occur, in particular in the edge region of the patterned functional coating. Consequently, the structural integrity of the functional coating is compromised.

In addition, both influences can adversely affect the optical properties. Thus, for example, perceptible optical defects can develop in the edge region of the functional coating.

After bending, complete, laborious removal of the protective layer is essential.

Starting from this situation, one object of the invention is to make available a device and a method that enables providing, economically and with high precision, curved glass layers that have a patterned coating.

BRIEF DESCRIPTION OF THE INVENTION

The object is accomplished by a device for producing a patterned functional coating on a first curved glass layer. The device has a support for holding the first curved glass layer, at least one laser, and a guidance unit. The guidance unit is provided for guiding the beam of the laser over the functional coating such that parts of the functional coating are removed in order to pattern the functional coating.

In other words, use of the device now enables first bending the glass layer and only subsequently undertaking the patterning. Thus, the step of applying functional coatings can be shifted until after the bending. Consequently, the application of a protective layer before bending and removal of the protective layer after bending can be dispensed with. Therefore, in addition to the avoidance of a possible reaction during bending, there is also the possible saving of process steps.

In one embodiment of the invention, the guidance unit is provided to displace the laser relative to the surface of the functional coating. This can enable economical production.

In another embodiment of the invention, the distance between the laser and the functional coating is approx. 0.5 m up to 2 m. Due to the relatively large distance between the laser and the functional coating, the focal region can be adjusted such that relatively small deviations in the shape of the glass layer and/or the coating are without significant influence on the patterning. As a result, the production process can get by without laborious distance measurements.

According to another embodiment of the invention, the laser provides pulsed laser radiation with power of 100 watts or more. With this, the necessary power for the patterning can be applied over the distance of a few meters such that the production time periods can be kept small.

According to still another embodiment of the invention, the light of the laser has a wavelength of 355 nm, 532 nm, or 1064 nm. Thus, it is possible to work with conventional lasers.

In another embodiment of the invention, the laser provides pulsed laser radiation with a period of a few nanoseconds to a few picoseconds. Thus, it is possible to remove not only small patterns but also large patterns.

According to another embodiment of the invention, the laser is a $CO_2$ laser. Thus, it is possible to work with conventional lasers.

The object is also accomplished by a method for producing a glass pane, which has the step of obtaining a first glass layer, wherein the first glass layer has, at least in sections, a functional coating. The method further has the step of patterning the functional coating on the first glass layer by laser ablation.

Consequently, a possible reaction during bending is avoided.

In one embodiment of the invention, the functional coating is applied after the bending of the glass layer. In other words, use of the method now enables first bending the glass layer and only subsequently undertaking the patterning. Thus, the step of applying functional coatings can also be shifted until after the bending. Consequently, the application of a protective layer before bending and removal of the protective layer after bending can be dispensed with.

In another embodiment of the invention, the step of patterning comprises the spatial displacement of a laser relative to the functional coating. This can enable economical production.

According to another embodiment of the invention, the method according to the invention can further comprise the step of obtaining a second glass layer, wherein the first glass layer and the second glass layer are correspondingly bent, the step of introducing a combination film between the functional coating on the first glass layer and the second glass layer, as well as the step of thermal bonding of the glass layers by means of the combination film. In other words, the method can also be used for producing composite glass panes.

In addition, the object is accomplished by glass panes that are obtained by a method according to the invention.

In an embodiment of the invention relative to a composite pane, the combination film includes at least one material selected from the group comprising polybutylene terephthalate (PBT), polycarbonate (PC), polyethylene terephthalate (PET) and polyethylene naphthalate (PEN), polyvinyl chloride (PVC), polyvinyl fluoride (PVF), polyvinyl butyral (PVB), ethylene vinyl acetate (EVA), polyacrylate (PA), polymethyl methacrylate (PMMA), polyurethane (PUR), and/or mixtures and copolymers thereof.

BRIEF DESCRIPTION OF THE DRAWINGS

Embodiments of the present invention are described by way of example with reference to the accompanying drawings, which depict.

DETAILED PRESENTATION OF THE INVENTION WITH REFERENCE TO THE DRAWINGS

In the following, the invention will be presented in detail with reference to the drawings. It must be noted that various aspects are described which can in each case be used individually or in combination. In other words, any aspect can be used with different embodiments of the invention unless explicitly represented as a pure alternative.

Moreover, in the following, for the sake of simplicity, reference is, generally speaking, always made to only one entity. Unless explicitly stated, the invention can, however, also refer in each case to a plurality of the entities in question. Thus, the use of the words "a" and "an" is understood to indicate that in a simple embodiment at least one entity is used.

In the methods described in the following, individual steps can be incorporated into a single step and executed, for example, in parallel with one another. In addition, the order of steps can vary such that the order of steps is not to be construed as mandatory, unless a specific order is described as explicitly necessary.

Figure 1:
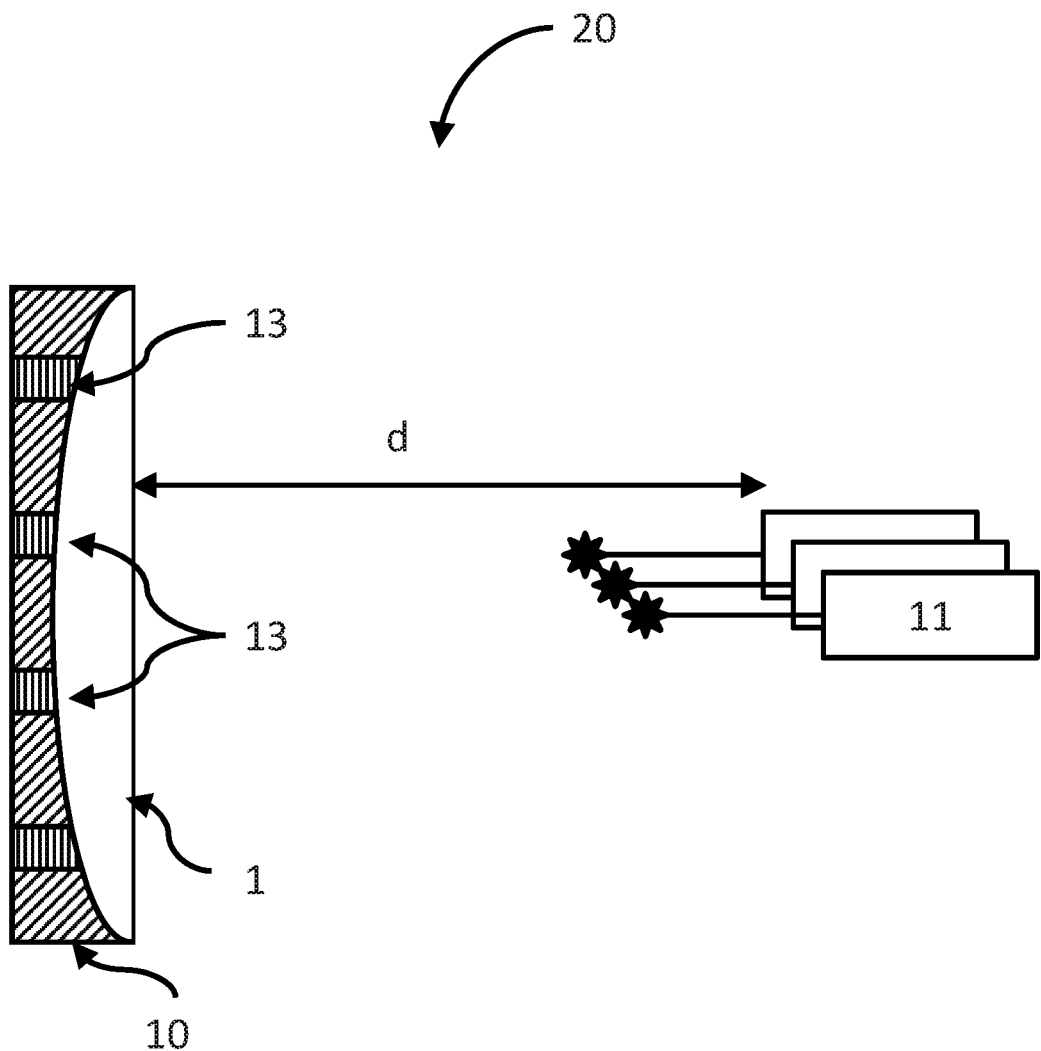
FIG. 1 a schematic representation of embodiments of devices according to the invention, FIG. 2 a schematic sectional representation of glass panes produced in accordance with the method according to the invention, FIG. 3 a schematic representation of one aspect of embodiments of devices according to the invention, FIG. 4 another schematic representation of an aspect of embodiments of devices according to the invention, and FIG. 5 a flowchart with steps in accordance with the methods according to the invention.

FIG. 1 depicts a schematic representation of embodiments of devices according to the invention for producing a patterned functional coating 5 on a first curved glass layer 2.

The device 20 has a support 10 for holding the first curved glass layer 2. This can, for example, be shaped like a frame for a specific type of glass layer 2 or a variety of types of glass layers 2.

The support 10 can, for example, have one or a plurality of holding devices 13 on the edge and/or even in the interior. Holding devices 13 can, for example, be implemented as clips or as negative-pressure chambers. Negative-pressure chambers, with which the glass layer 2 can be quickly and reliably held at a variety of locations, are particularly advantageous. The support 10 is preferably shaped such that the respective glass layer 2 is held substantially without stress. For this, the support 10 has a shape substantially adapted to the shape of the curved glass layer with low tolerances in the contact region of preferably less than +/−0.5 mm, particularly preferably less than +/−0.2 mm.

The device 20 further has at least one laser 11 and one guidance unit 12. The guidance unit 12 is provided to guide the beam of the laser 11 over the functional coating 5 such that parts of the coating 5 are removed in order to pattern the functional coating 5. The removal of the coating 5 can be done both by direct irradiation of the coating 5 as well as by indirect irradiation of the coating 5 through the glass layer 2. In other words, the use of the device 20 now enables first bending the glass layer and only subsequently undertaking the patterning.

Thus, even the step of application of functional coatings 5 can also be shifted to a time after the bending. Consequently, the application of a protective layer before bending and the removal of the protective layer after bending can be dispensed with.

Since the patterning does not occur until after the bending, the previously occurring problems of reactions on the patterned edges as well as altering the optical properties of the patterns caused by heating are avoided.

In addition, when the application of the functional coating 5 is shifted to a time after the bending, the steps of application of a protective layer before the bending and of removal of the protective layer after the bending can be eliminated from the production method, yielding a time and cost advantage.

Depending on the design of the device 20, one or a plurality of lasers 11 can be provided. These lasers 11 can be arranged differently spatially and/or can have different optical properties, such as pulse duration, wavelength, power.

To the extent the invention refers to patterning of the coating 5, this means any type of patterning, but, in particular, complete removal for generating relatively large exposed areas, linear removal for generating, for example, conductor track patterns, such as heating wires and/or antennas, as well as generating gridlike patterns. The width of the patterning of the coating 5 is typically 100-150 μm or larger. Furthermore, to the extent the invention refers to functional coatings, this means, in particular, electrically conductive coatings, such as silver-containing layers. Another functional coating is, for example, a low-E coating. Essential here is only that there is a suitable laser 11 that can remove the respective coating 5.

Provision can be readily made for the focus position of the laser 11 to be corrected automatically such that precise patterning can be achieved without additional displacement of the laser 11 relative to the glass layer 2 or the coating 5. For example, the focus position can have a tolerance of +/−5 mm such that, for example, the bending tolerance of a curved glass layer 2 can be well compensated.

Figure 3:
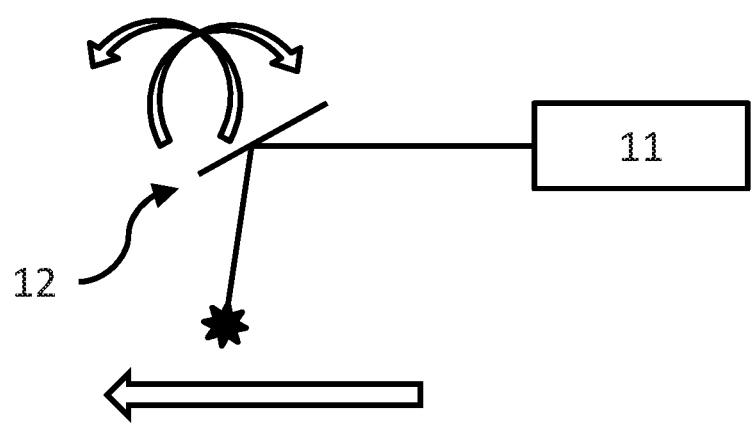
Figure 4:
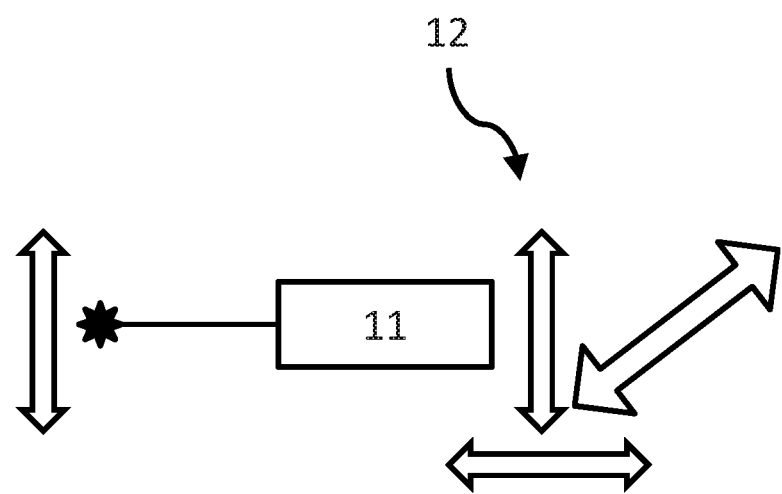

In the context of the invention, different principles can be used as a guidance unit 12, as shown in FIGS. 3 and 4 by way of example.

For example, a guidance unit 12 in the form of a tilting mirror can be provided for a laser 11 (or a plurality of lasers 11). Depending on the degrees of freedom of the carriage as an example of a guidance unit 12 in FIG. 3, the curved surface (depicted as concave) of a glass pane 1 with a functional coating 5 oriented toward the laser beam can thus be scanned in one or a plurality of directions. By appropriate control of the movement of the guidance unit and of the laser 11, the functional coating can then be patterned.

Alternatively or additionally, provision can be made for a guidance unit 12 in the form of a carriage movable in one, two, or three dimensions to be provided for a laser 11 (or a plurality of lasers 11). Depending on the degrees of freedom of the mirror as an example of a guidance unit 12 in FIG. 4, the curved surface (depicted as concave) of a glass pane 1 with a functional coating 5 oriented toward the laser beam can thus be scanned in one or a plurality of directions. By appropriate control of the movement of the guidance unit and the laser 11, the functional coating can then be patterned.

Mixed forms can also be readily provided here.

If only a small number of lasers 11 with a fixed position relative to the support 10 are used, this is advantageous since, then, there are fewer border regions with overlapping and misalignment.

Border regions occur when a laser has to be moved to obtain a patterned surface larger than its scan field. Since a certain tolerance is present both in the thickness of the glass layer 2 and of the functional coating 5 and, in addition, there is play upon movement from one position to another position, a certain overlap must be factored in. However, the tolerances also create a slight misalignment.

In a preferred embodiment of the invention, the distance d between the laser 11 and the functional coating 5 is, as sketched in FIG. 1, approx. 0.5 m up to 2 m. The course d need not be linear, but, rather, one or a plurality of deflection elements can be provided in the beam path. In other words, d denotes the length of the path that a light beam travels after leaving the laser 11 until it strikes the functional coating 5 to be patterned.

Due to the relatively large distance d between the laser 11 and the functional coating 5, the focal region can be adjusted such that relatively small deviations in the shape of the glass layer 2 and/or of the coating 5 are without significant influence on the patterning. As a result, the production process can get by without laborious distance measurements. In addition, a relatively large distance makes it possible for the scan field to be large enough that the laser 11 does not have to be moved relative to a region to be patterned, but, instead, the laser beam (cf. FIG. 3) is guided only by a guidance unit 12 over the entire region, e.g., 150 cm*150 cm. The scan field is preferably greater than 150 mm*150 mm, e.g., greater than 1000 mm×1000 mm.

Here, by a suitable arrangement, e.g., of two lasers relative to a vehicle windshield, one laser can be used for the patterning for a right side of the vehicle windshield, whereas the other laser can be used for the patterning for the left side.

Obviously, the duration of the patterning can be reduced through the use of multiple lasers 11 and associated guidance units 12. However, it is preferable for the lasers 11 to be stationary in each case relative to a surface to be patterned such that no overlapping or misalignment occurs.

Lasers 11 according to embodiments of the invention provide pulsed laser radiation with power of 100 watts or more. According to one embodiment of the invention, the light of the laser 11 has a wavelength of 355 nm, 532 nm, or 1064 nm and/or the laser 11 provides pulsed laser radiation with a period of a few nanoseconds to a few picoseconds. In other words, commercially available lasers, such as $CO_2$ lasers, Nd:YAG lasers, can be used.

Suitable pulse rates for the laser 11 are more than 100 kHz, or more than 1 MHz. Thus, a processing speed of a few m/s, e.g., 20 m/s-50 m/s, can be achieved.

Figure 5:
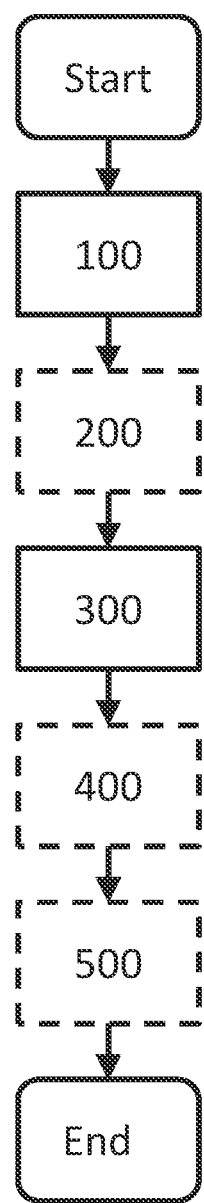

As already indicated above, the invention allows a new production method, which is outlined in FIG. 5. The method for producing a glass pane 1, as it is sketched in its layer structure in FIG. 2, first comprises the step of obtaining 100 a first curved glass layer 2, wherein the first glass layer 2 has, at least in sections, a functional coating 5. The glass layer 2 is introduced into the support 10 and fixed such that the coating 5 is positioned closer to the laser 11. Now, the functional coating 5 on the first glass layer 2 is patterned 300 by laser ablation.

Consequently, a possible reaction during bending is avoided.

In one embodiment of the invention, the functional coating 5 is applied after the bending of the glass layer 2. In other words, use of the method now enables first bending the glass layer and only subsequently undertaking the patterning. Thus, the step of applying functional coatings 5 can also be shifted until after the bending. Consequently, the application of a protective layer before bending and removal of the protective layer after bending can be dispensed with.

In another embodiment of the invention, the step of patterning comprises the spatial displacement of a laser 11 relative the functional coating 5. This can enable economical production.

According to another embodiment of the invention, the method according to the invention can further comprise the step of obtaining 200 a second glass layer 3, wherein the first glass layer 2 and the second glass layer 3 are correspondingly bent, the step of introducing 400 a combination film 4 between the functional coating 5, that is situated on the first glass layer 2, and the second glass layer 3, as well as the step of the thermal bonding 500 of the glass layers 2 and 3 by means of the combination film 4.

Typically, the step of the thermal bonding 500 is carried out at a temperature of typically less than 140° C., i.e., at least at a temperature that is lower than the temperature for bending such that reactions of a functional coating 5 are not to be anticipated.

Figure 2:
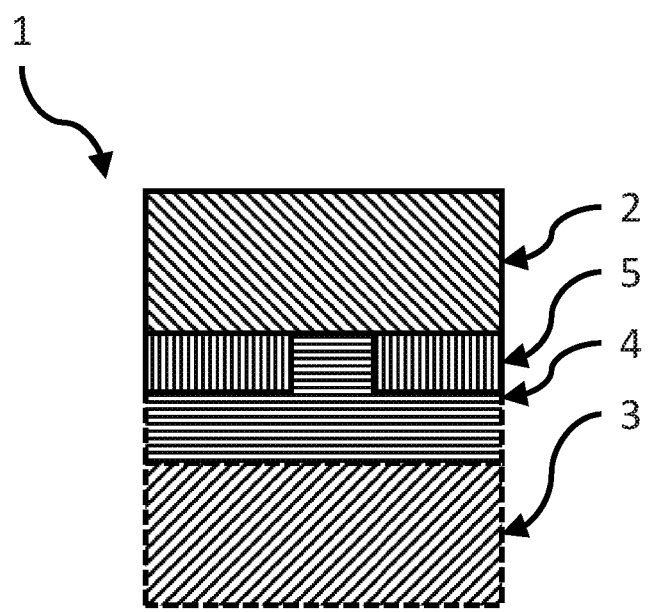

In other words, the method can also be used for producing composite glass panes 1—as depicted by dashed lines in FIG. 2 by the second glass layer 3 and the combination film 4.

In addition, the object is accomplished by glass panes that are obtained by a method according to the invention.

In an embodiment of the invention relative to a composite pane 1, the combination film 4 includes at least one material selected from the group comprising polybutylene terephthalate (PBT), polycarbonate (PC), polyethylene terephthalate (PET) and polyethylene naphthalate (PEN), polyvinyl chloride (PVC), polyvinyl fluoride (PVF), polyvinyl butyral (PVB), ethylene vinyl acetate (EVA), polyacrylate (PA), polymethyl methacrylate (PMMA), polyurethane (PUR), and/or mixtures and copolymers thereof.

Without loss of generality, a glass pane 1 according to the invention can be used in vehicles, e.g., as a front, rear, or side window or in buildings or as an information display.

LIST OF REFERENCE CHARACTERS 1 glass pane
2 first curved glass layer
3 second curved glass layer
4 combination film
5 functional coating
10 support
11 laser
12 guidance unit
13 holding device
20 device
d distance between the laser 11 and the functional coating 5
Steps
100 Obtaining a first curved glass layer 2
200 Obtaining a second curved glass layer 3
300 Patterning the functional coating 5
400 Introducing a combination film 4
500 Thermal bonding of the glass layers 2,3

The invention claimed is:

1. A device for producing a patterned functional coating on a first curved glass layer for a glass pane, wherein the functional coating has an electrically conductive coating and/or a low-E coating, the device comprising a support for holding the first curved glass layer,
at least one laser, and
a guidance unit, provided for guiding a beam of the laser over the functional coating such that parts of the functional coating are removed in order to pattern the functional coating in the surface.

2. The device according to claim 1, wherein the guidance unit is provided to displace the laser relative to the surface of the functional coating.

3. The device according to claim 1, wherein a distance between the laser and the functional coating is approx. 0.5 m up to 2 m.

4. The device according to claim 1, wherein the laser provides pulsed laser radiation with power of 100 watts or more.

5. The device according to claim 1, wherein a light of the laser has a wavelength of 355 nm, 532 nm, or 1064 nm.

6. The device according to claim 1, wherein the laser provides pulsed laser radiation with a period of a few nanoseconds to a few picoseconds.

7. The device according to claim 1, wherein the laser is a $CO_2$ laser.

* * * * *